July 7, 1942.   A. R. BULLOCK   2,289,241
ELECTRODYNAMIC CONTROL SYSTEM
Filed Nov. 29, 1940   3 Sheets-Sheet 1

INVENTOR
Arthur R. Bullock
BY
ATTORNEY

July 7, 1942.　　　　A. R. BULLOCK　　　　2,289,241
ELECTRODYNAMIC CONTROL SYSTEM
Filed Nov. 29, 1940　　　3 Sheets-Sheet 3

INVENTOR
*Arthur R. Bullock*
BY
*Marshall E Hawley*
ATTORNEYS

Patented July 7, 1942

2,289,241

UNITED STATES PATENT OFFICE 2,289,241

ELECTRODYNAMIC CONTROL SYSTEM

Arthur R. Bullock, Elizabeth, N. J., assignor, by mesne assignments, to Essex Engineering Corporation, Short Hills, N. J., a corporation of New Jersey Application November 29, 1940, Serial No. 367,832

15 Claims. (Cl. 172—239)

This invention relates to improvements in electrodynamic control systems. Its object is to provide a combination of instrumentalities for controlling motion, which has advantages over such arrangements as have been available heretofore.

Another object is to provide an arrangement for changing the position or rate of speed of a controlled member or its direction of movement, in which a minimum amount of force is required to actuate the system and wherein the initial force may be amplified in one or more steps to any desired extent, to provide as much force as needed for accomplishing desired ends.

More specifically, the invention relates to an arrangement wherein a current of electricity applied to produce a revolving field may be used to move a desired member such, for example, as the rotor of a motor, either a desired amount from a position of rest or to vary the rate or direction of its rotation with a substantially uniform torque.

These and other objects of the invention will appear in the following specification in which I will describe certain embodiments of the invention, the novel features of which will be pointed out in appended claims.

Referring to the drawings.

Figures 1, 2:
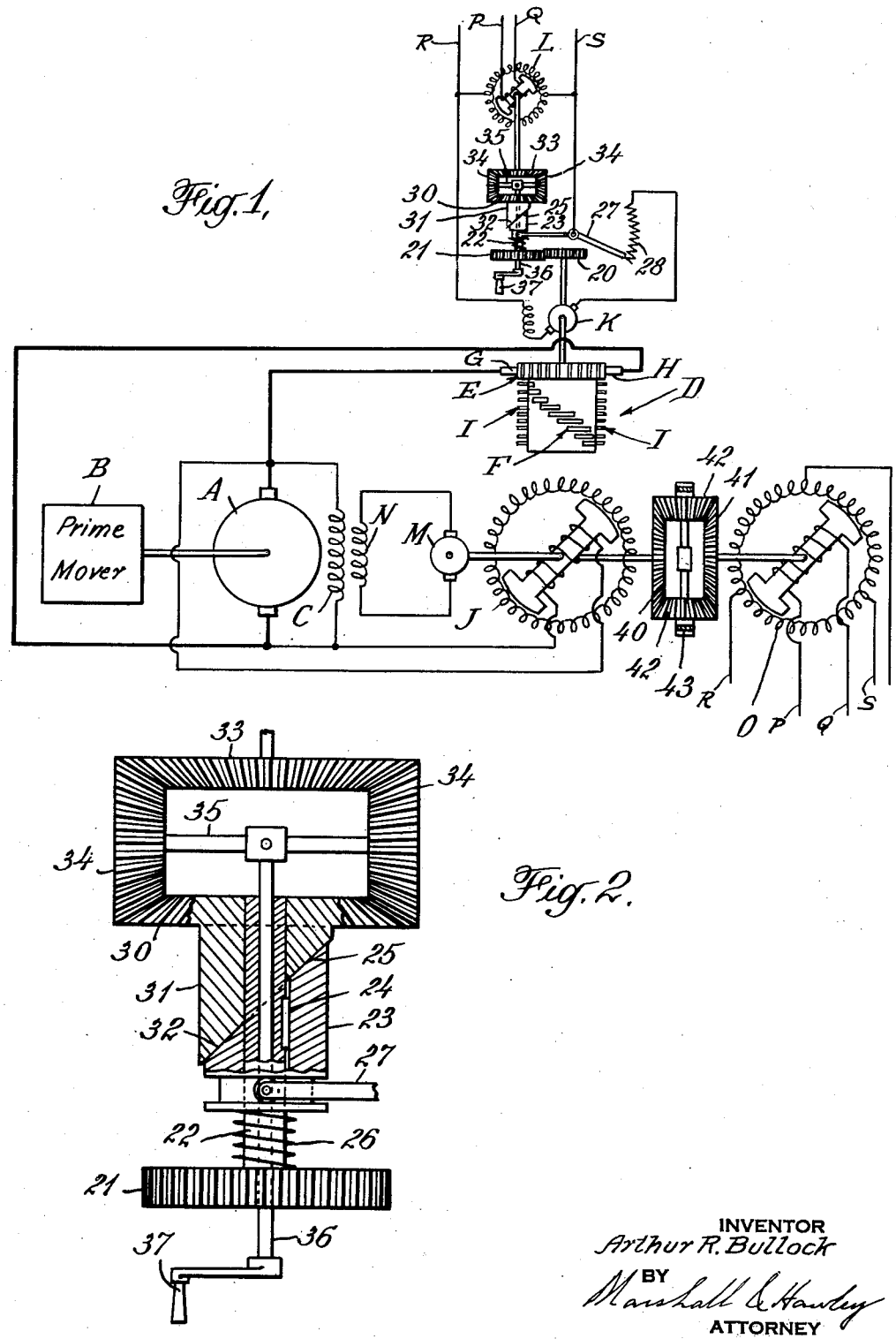
Fig. 1 is a diagrammatic representation of an embodiment of my invention illustrated by certain mechanical and electrical devices combined in a novel manner.
Fig. 2 is an enlarged view, partly in section of some of the mechanisms shown in Fig. 1.

In Fig. 1, A designates the armature of a direct current generator driven by some suitable source of power, such as a prime mover shown at B. C is a shunt field winding for the generator A. This shunt field winding is so proportioned as to provide only a partial saturation of the magnetic field of the generator. This may be arranged, for example, to effect about 40% of the field magnetization.

D designates a rotatable current distributing device. This comprises a commutator E having a plurality of bars and a series of spaced contact members F forming parts of a cylindrical surface. The armature of the direct current generator A is connected with brushes G and H which in this specific case bear upon diametrically opposed parts of the commutator E. The commutator bars are connected in regular sequence with the contact members F. Associated with the contact members F are collector brushes I which are connected to angularly spaced points on the stator winding of a motor J. A synchronous motor with its rotor coil connected to the armature of the direct current generator A is shown as one form which is suitable for this purpose.

Figure 3:
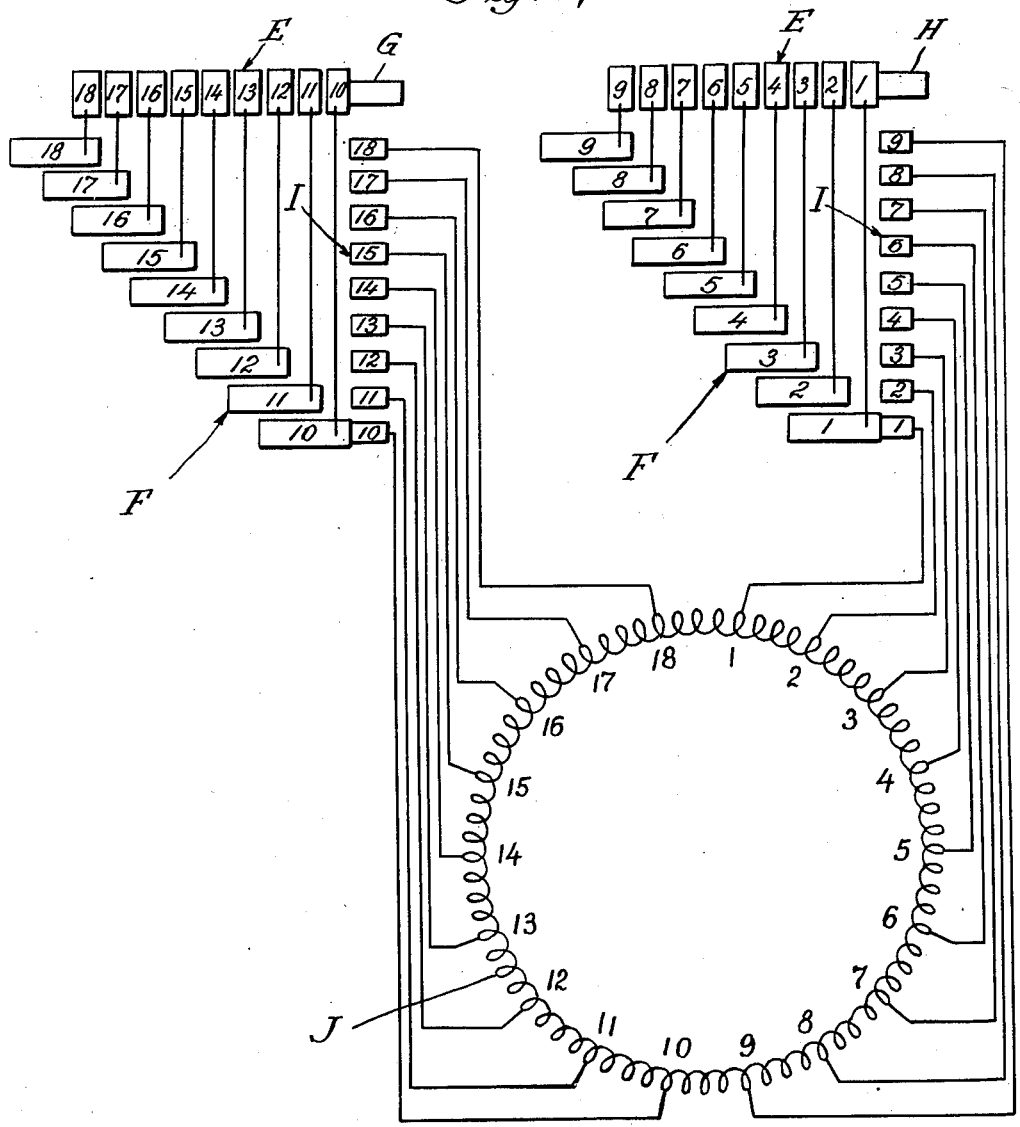
Fig. 3 is a wiring diagram showing the manner in which the parts of some of the instrumentalities shown in Fig. 1 are interconnected.

Fig. 3 illustrates the manner in which the bars of the commutator E, contact members F, collector brushes I and the stator winding of the motor J are interconnected. In this figure the cylindrical commutator and contact members are developed and separated. The bars of the commutator are numbered, respectively, 1-18. The contact members F and collector brushes I are similarly numbered. The points on the stator winding of the motor J to which the collector brushes I are connected are also numbered 1-18. From this figure it may be seen that the commutator bars 1, 2, 3, etc. are connected to the contact members 1, 2, 3, etc., and that the collector brushes 1-18 are connected to the points 1-18 of the stator J, successively. The contact members are divided into two groups of which similar numbers, such as 1 and 10, 2 and 11, etc. are in transverse alinement. The collector brushes are divided into two groups 1-9 and 10-18, and similar brushes of each group, such as brush 1 and brush 10, are connected to opposite points on the stator winding.

Referring to Fig. 1, it may be seen that the rotatable current distributing device D is connected to the shaft of a variable power helper motor K, shown in this particular instance as an alternating current motor of the commutating type. This same shaft is connected by gears 20 and 21 to a sleeve 22 on which a collar 23 is mounted for longitudinal movement. 24 is a spline between the collar 23 and the sleeve 22 to prevent relative rotation between the collar and the sleeve. The upper end of collar 23 is constructed to form an inclined cam surface 25.

30 is a bevel gear having a hub 31 rotatably mounted on the sleeve 22. The lower end of this hub is constructed to form an inclined cam surface 32 which cooperates with the cam surface 25 of the collar.

33 is a bevel gear of the same diameter and number of teeth as the gear 30. This gear 33 is driven at a constant speed by a suitable device, such as a synchronous motor L. The gears 30 and 33 are interconnected by bevel pinions 34 to form a differential assembly. The pinions 34 are rotatably mounted on an arm 35 which is keyed to a control shaft 36 running through the sleeve 22. The shaft 36 may be held stationary or may be given an angular or rotative movement in either direction or at any rate of speed. A crank handle 37 is shown on the control shaft in order to illustrate the operation of the system.

When the shaft 36 is stationary the rotation of motor L will be imparted to the gear 33 and through the pinions 34 to the gear 30 in an opposite direction. This rotation of the gear 30 will be imparted to collar 23 and to sleeve 22 to which it is splined, by the engagement of the cam surfaces 32 and 25 which are held in engagement with each other by a spring 26 interposed between the collar 23 and the gear 21. This rotation is imparted to the shaft of motor K and to the current distributing device D. The motor K is used to assist motor L in maintaining this rotation. Motor K thereby furnishes whatever power is required to rotate the distributor D and gear 30 so as to eliminate substantially all reaction torque on control shaft 36. Consequently, the control shaft 36 will remain at rest when no external force is applied to it and can be turned by the application of a relatively small amount of force.

It will be noted that when control shaft 36 is at rest, a rotating field will be set up in the stator of the motor J at exactly the same rate of speed as that of the synchronous motor L. The movement or the rate of speed of the rotor of motor J may be increased or decreased from a minute degree up to any rate at which the control shaft may be moved. For example, if the gear 33 is driven in a clockwise direction as viewed from below and the control shaft 36 is turned in the same direction, the rate of speed of the gear 30 will be decreased an amount directly proportional to the rotation of the control shaft. This will result in a corresponding decrease in the rate of speed of the distributor D and of the rotor of motor J.

If the control shaft 36 is moved in a counter-clockwise direction, it will have the opposite effect and will cause the distributor, and consequently the rotor of the motor J, to be driven at a higher rate of speed. When this is done there is a tendency for the cam surface 32 to push the cam surface 25 on the collar 23 downwardly against the action of spring 26. This causes a switch blade 27 to be moved upwardly on a rheostat 28 to increase the current flowing through the variable speed motor K. This will compensate for the additional load required to drive the distributor D at a higher rate of speed and will prevent an unbalanced reaction torque on the differential from being transmitted through pinions 34 to the control shaft 36. Thus, it may be seen that the rate of rotation of the rotor of the motor J may be controlled with ease and great precision. For conditions where the utmost precision is required the rotor of motor J should be of the synchronous motor type.

While only one motor J is shown in Fig. 1, it is obvious that as many of them as desired can be controlled simultaneously from the distributor D and that they may be of the same or of different sizes. Some of them may be no larger than needed to drive the pointer of an indicating instrument.

Connected with the shaft of the motor J is a booster generator M, preferably of the type having a permanent or constant magnetic field. The current generated thereby is passed through an auxiliary field winding N of the generator A. This, cooperating with the shunt field winding C, causes the voltage of the generator A to increase when the speed of the booster generator is increased and to decrease the voltage when the speed of the latter is decreased. This tends to maintain a constant current value in the distributor D and in the motor J at all speeds regardless of reactance variations due to change of speed. As a result, a substantially constant torque on the rotor of the motor J is maintained.

When it is desired to control a driven member from a position of rest to another position or to a condition of rotation in either direction and at any desired rate of speed, the shaft of the motor J is connected to drive a bevel gear 40 of a differential gear assembly comprising another bevel gear 41 and interconnection pinions 42. The gear 41 is driven in step with the rotor of the synchronous motor L. This may be accomplished by connecting gear 41 with the rotor of another synchronous motor O operated by the same source of power as motor L. The rotors of the motors L and O are connected with the power lines P and Q and the stators with the power lines R and S.

The pinions 42 are mounted on a spider which is rotatable about the axis of gears 40 and 41. As long as the control shaft 36 is at rest this spider will remain at rest. Any movement of the control shaft 36 will be imparted to the spider on which the pinions 42 are mounted and the movement of this spider may be imparted to a desired member by means of an annular gear 43 on the spider. The movement of the spider will follow the movement of control shaft 36 with great precision. It is obvious that by making the motors J and O of sufficient size any desired amount of power may be made available for moving the annular gear 43 and any mechanism which may be connected therewith.

It will be noted that the angular position of the distributor D controls that of the rotor of motor J so that any desired movement may be imparted to this rotor by moving the distributor. The distributor may be moved by hand instead of by any such mechanisms as those shown and described and the rotor will move to a corresponding position. By using a synchronous type rotor energized by direct current, the full torque of the motor J will be available for effecting this movement. The distributor may be driven also by any variable speed device, such for example, as a small manually controlled variable speed motor, the variations in the speed of which will be followed by the rotor of motor J.

Figure 4:
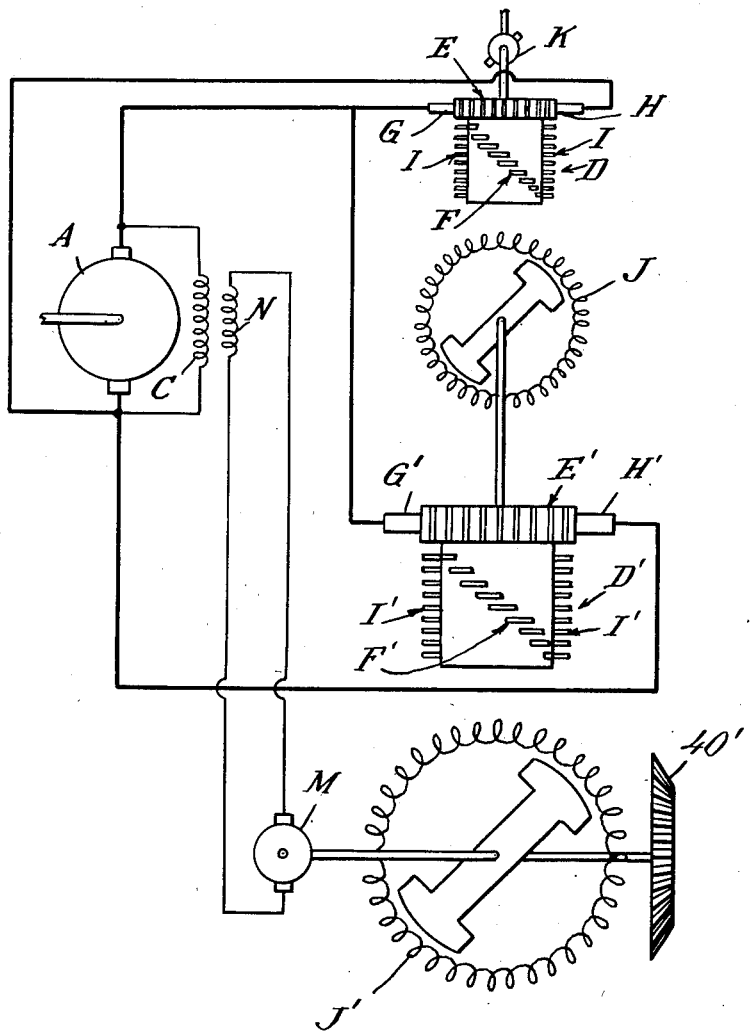
Fig. 4 is a drawing similar to Fig. 1 illustrating a modification of the invention in which instrumentalities for producing more than one step of power amplification are employed.

In Fig. 4 a method of multiple power amplification is illustrated. In this figure the generator A, motor J and intermediate parts and circuits are like those shown in Fig. 1. The rotor of motor J is in this case arranged to drive another rotatable current distributing device D' which has a commutator E' on which brushes G' and H' bear, these brushes being connected with the armature of generator A. This distributor also has contact members F' and collector brushes I'. The latter are connected to equally spaced points on the stator winding of another motor J'. The rotor of motor J' is connected to drive a desired member, such as a gear 40' of a differential gear arrangement similar to that shown in Fig. 1. Its rotor is also arranged to drive the booster generator M for the auxiliary field winding N of the generator A.

In Figs. 1 and 4 the electrical conductors between collector brushes I and stator windings of motor J and also between the collector brushes I' and stator windings of motor J' have been omitted for the purpose of clarity. These windings are specifically illustrated in Fig. 3.

By such an arrangement as the one shown in this Fig. 4 a further amplification of power is developed between the motor J and the motor J'. More amplification steps of this same character may be added, if desired.

It is obvious that this invention is applicable to many uses and that many modifications of apparatus and circuits may be made within its spirit and scope and I intend no limitations other than those imposed by the appended claims.

What I claim is:

1. A direct current generator, a motor having an annular stator winding and a rotor, a distributor between said generator and said motor arranged to create a rotating field in said stator and means controlled by the rate of rotation of the rotor for varying the voltage of the generator to thereby maintain a substantially uniform motor torque.

2. A direct current generator, a motor having an annular stator winding and a rotor, a distributor between the generator and motor arranged to create a rotating field in said stator, a booster generator driven by the rotor arranged to vary the voltage of said direct current generator to thereby maintain a substantially uniform motor torque.

3. A direct current generator, a motor having an annular stator winding and a rotor having a coil, a distributor between said generator and said motor arranged to create a rotating field in said stator and means controlled by the rate of rotation of the rotor for varying the voltage of the generator and means for connecting the generator to the rotor coil.

4. A direct current generator having an auxiliary field winding, a motor having an annular stator winding and a rotor, a distributor between the generator and motor arranged to create a rotating field in said stator, a booster generator driven by the rotor arranged to energize the auxiliary field winding of the direct current generator to vary the voltage of said direct current generator and thereby maintain a substantially uniform motor torque.

5. A direct current generator having an auxiliary field winding, a synchronous motor having an annular stator winding and a rotor having a coil, a distributor between the generator and motor arranged to create a rotating field in said stator, a booster generator driven by the rotor arranged to energize the auxiliary field winding of the direct current generator to vary the voltage of said direct current generator and thereby maintain a substantially uniform motor torque, and means for connecting the direct current generator to the rotor coil.

6. A differential gear assembly comprising a pair of gears and an interconnecting pinion, a control shaft arranged to impart a planetary movement to the pinion, means for driving one of the gears at a constant rate of speed, a member connected to be driven with the other gear at a rate of speed variable in response to movement of the control shaft, and means for driving said member to counteract reactance torque on the control shaft.

7. A differential gear assembly comprising a pair of gears and an interconnecting pinion, a control shaft arranged to impart a planetary movement to the pinion, means for driving one of the gears at a constant rate of speed, a member connected to be driven with the other gear at a rate of speed variable in response to movement of the control shaft, means for driving said member to counteract reactance torque on the control shaft, and means for automatically varying the power of the last mentioned driving means in proportion to the work required to drive said member.

8. A differential gear assembly comprising a pair of gears and an interconnecting pinion, a control shaft arranged to impart a planetary movement to the pinion, a synchronous motor for driving one of the gears at a constant rate of speed, a member connected to be driven with the other gear at a rate of speed variable in response to movement of the control shaft, and a variable power helper motor for driving said member to counteract reactance torque on the control shaft.

9. A differential gear assembly comprising a pair of gears and an interconnecting pinion, a control shaft arranged to impart a planetary movement to the pinion, a synchronous motor for driving one of the gears at a constant rate of speed, a member connected to be driven with the other gear at a rate of speed variable in response to movement of the control shaft, a variable power helper motor for driving said member to counteract reactance torque on the control shaft, and means for automatically varying the power of the helper motor in accordance to the work required to drive said member.

10. A differential gear assembly comprising a pair of gears and an interconnecting pinion, a control shaft arranged to impart a planetary movement to the pinion, means for driving one of the gears at a constant rate of speed, a rotative distributor connected to be driven with the other gear at a rate of speed variable in response to movement of the control shaft, means for driving the distributor to counteract reactance torque on the control shaft, said distributor comprising a commutator having a plurality of bars and a plurality of groups of contact members connected in regular sequence with the commutator bars, means for leading an electric current to angularly spaced bars of the commutator, stationary collector brushes diagonally positioned in relation to said contact members, a rotor, a stator, an annular stator winding, connections between the collector brushes of one group of contact members and angularly spaced points on the stator winding, and connections between another group of collector brushes and other spaced points on the stator winding symmetrically disposed in relation to the first mentioned points.

11. A differential gear assembly comprising a pair of gears and an interconnecting pinion, a control shaft arranged to impart a planetary movement to the pinion, a synchronous motor for driving one of the gears at a constant rate of speed, a rotative distributor connected to be driven with the other gear at a rate of speed variable in response to movement of the control shaft, a variable power helper motor for driving said distributor to counteract reactance torque on the control shaft, said distributor comprising a commutator having a plurality of bars and a plurality of groups of contact members connected in regular sequence with the commutator bars, means for leading an electric current to angularly spaced bars of the commutator, stationary collector brushes diagonally positioned in relation to said contact members, a rotor, a stator, an annular stator winding, connections between the collector brushes of one group of contact members and angularly spaced points on the stator winding, and connections between another group of collector brushes and other spaced points on the stator winding symmetrically disposed in relation to the first mentioned points.

12. A differential gear assembly comprising a pair of gears and an interconnecting pinion, a control shaft arranged to impart a planetary movement to the pinion, a synchronous motor for driving one of the gears at a constant rate of speed, a rotative distributor connected to be driven with the other gear at a rate of speed variable in response to movement of the control shaft, a variable power helper motor for driving said distributor to counteract reactance torque on the control shaft, means for automatically varying the power of the helper motor in accordance to the work required to drive the distributor, said distributor comprising a commutator having a plurality of bars and a plurality of groups of contact members connected in regular sequence with the commutator bars, means for leading a direct current to angularly spaced bars of the commutator, stationary collector brushes diagonally positioned in relation to said contact members, a motor having a rotor of the synchronous motor type and an annular stator winding, connections between the collector brushes of one group of contact members and angularly spaced points on the stator winding, and connections between another group of collector brushes and other spaced points on the stator winding symmetrically disposed in relation to the first mentioned points.

13. A differential gear assembly comprising a pair of gears and an interconnecting pinion, a control shaft arranged to impart a planetary movement to the pinion, means for driving one of the gears at a constant rate of speed, a rotative distributor connected to be driven with the other gear at a rate of speed variable in response to movement of the control shaft, means for driving the distributor to counteract reactance torque on the control shaft, a direct current generator, a motor having an annular stator winding and a rotor, said distributor being between the generator and the motor and being arranged to create a rotating field in said stator, and means controlled by the rate of rotation of the rotor for varying the voltage of the generator to thereby maintain a substanially uniform motor torque.

14. A differential gear assembly comprising a pair of gears and an interconnecting pinion, a control shaft arranged to impart a planetary movement to the pinion, a synchronous motor for driving one of the gears at a constant rate of speed, a rotative distributor connected to be driven with the other gear at a rate of speed variable in response to movement of the control shaft, a variable power helper motor for driving said distributor to counteract reactance torque on the control shaft, a direct current generator, a motor having an annular stator winding and a rotor, said distributor being between the generator and the motor and being arranged to create a rotating field in said stator, a booster generator driven by the rotor arranged to vary the voltage of said direct current generator and thereby maintain a substantially uniform motor torque.

15. A differential gear assembly comprising a pair of gears and an interconnecting pinion, a control shaft arranged to impart a planetary movement to the pinion, a synchronous motor for driving one of the gears at a constant rate of speed, a rotative distributor connected to be driven with the other gear at a rate of speed variable in response to movement of the control shaft, a variable power helper motor for driving said distributor to counteract reactance torque on the control shaft, means for automatically varying the power of the helper motor in accordance to the work required to drive the distributor, a direct current generator having an auxiliary field winding, a synchronous motor having an annular stator winding and a rotor having a coil, said distributor being between the generator and motor and being arranged to create a rotating field in said stator, a booster generator driven by the rotor arranged to energize the auxiliary field winding of the direct current generator to vary the voltage of said direct current generator and thereby maintain a substantially uniform motor torque, and means for connecting the direct current generator to the rotor coil.

ARTHUR R. BULLOCK.